United States Patent [19]
Forsthoff et al.

[11] 3,857,674
[45] Dec. 31, 1974

[54] HAIR COLOURANTS

[75] Inventors: Ernst Ludwig Forsthoff, Schenfeld; Rudolf Vogl, Bad Segeberg, both of Germany

[73] Assignee: Lever Brothers Company, New York, N.Y.

[22] Filed: May 3, 1973

[21] Appl. No.: 356,869

Related U.S. Application Data

[62] Division of Ser. No. 203,048, Nov. 29, 1971, abandoned.

[30] Foreign Application Priority Data
Dec. 4, 1970   Luxembourg .......................... 62178

[52] U.S. Cl. .................................................. 8/10.2
[51] Int. Cl. ............................................. A61k 7/12
[58] Field of Search ........................................ 8/10.2

[56] References Cited
UNITED STATES PATENTS
3,698,852   10/1972   Pantzer et al .......................... 8/10.2

Primary Examiner—Sam Rosen
Attorney, Agent, or Firm—Lever Brothers Company

[57] ABSTRACT

This invention relates to novel compounds suitable for use in oxidation-type hair colourant compositions. The compounds are 1,2- or 1,3-diaminobenzenes substituted at the positions para to the amino groups by non-oxidisable substituents, for example halogen atoms such as fluorine, chlorine or bromine or $C_1$ to $C_3$ alkyl groups such as methyl groups. The compounds can be formulated into colourants producing brown shades having improved light resistance by combining them with 2,5-diaminotoluene or a salt thereof and, optionally resorcinol.

4 Claims, No Drawings

HAIR COLOURANTS

This is a division of application Ser. No. 203,048, filed Nov. 29, 1971, now abandoned.

This invention relates to novel dyestuffs suitable for colouring keratinous fibres, in particular human hair and compositions containing the dyestuffs.

The conventional method of hair dyeing consists in applying aromatic p-diamines for example 2,5-diaminotoluene, together with aromatic dihydroxy compounds to the hair, allowing them to absorb on the hair and oxidising them with an oxidising agent. In this way azine-containing pigments are formed viz quinone-imine intermediates. The light fastness of the colours produced in this way can be improved by the addition to the dyestuff mixture of 1,2- or 1,3-diaminobenzenes which can carry various substituents. For example 2,4-diaminoanisole has been found to increase the light fastness of colourations obtained from compositions containing 2,5-diaminotoluene. It is also being suggested that good light-fastness can be achieved in blonde and chestnut colours and also in the blue and green fashion shades by using equimolar quantities of aromatic p-diamines on the one hand, and aromatic metadiamines, amino phenols and dihydroxy compounds on the other. However, it has not proved practicable to achieve satisfactory light-fastness in the natural brown shades as applied to greying or white hair and this is particularly so in the popular nut brown and ash brown shades which the hair is expected to retain without red tinges for several weeks.

One approach to solving this latter problem is to mix with the 2,5-diaminotoluene-containing colourant composition aromatic diamines or amino phenols which produce a bluish-green colour to compensate for the undesirable yellowish-red to red tinges which eventually develop. This approach has not proved entirely satisfactory, since hair which has been treated by other chemical processes, for example permanent waving, has a varying degree of absorbancy and this can result in patchy greenish tinges in various parts of the hair.

We have now discovered a new class of dyestuffs which can be formulated into compositions producing brown shades on the hair on oxidation.

Accordingly, the present invention provides a dyestuff suitable for colouring keratinous fibres being a 1,2- or 1,3-diaminobenzene substituted in the positions para to the amino groups by identical non-oxidisable substituents.

The non-oxidisable substituents may be halogen atoms, for example fluorine, chlorine or bromine atoms, or $C_1$ to $C_3$ alkyl groups. Where the substituents are alkyl groups it is preferred that they should be methyl.

In a second aspect the invention provides a composition suitable for colouring keratinous fibres comprising a combination of a dyestuff as described above and 2,5-diaminotoluene. The composition may also comprise resorcinol.

The molar ratio of the novel dyestuff to the 2,5-diaminotoluene is preferably less than 1:1. The best results will be obtained from these compositions if they are adjusted to between pH 8 and 10.

It will be understood that the description of the aromatic substituents as non-oxidisable should be taken to mean that they are non-oxidisable under the conditions of oxidation on the hair, that is in the presence of hydrogen peroxide at intermediate pH.

The invention will be further described by way of the following examples.

EXAMPLE 1

15 parts of glycerol monostearate, 8 parts of cetyl alcohol, 5 parts of propylene glycol stearate, and 3 parts of 30% alkyl sulphonate were melted together, and a mixture of 1.6 parts by weight of 1,2-dimethyl-4,5-diaminobenzene 2.2 parts by weight of 2,5-diaminotoluene sulphate, and 1.1 parts by weight of resorcinol was added. Water, ammonium phosphate, and ammonia up to pH 8–10 were then introduced, and the mixture was stirred until a homogenous paste was obtained. This hair dyeing cream was mixed with 20 vol-% hydrogen peroxide. Blonde untreated switches of human hair were then dyed for 30 minutes at room temperature, giving a very natural dark brown shade.

EXAMPLE 2

1,2-dimethyl-4,5-diaminobenzene was replaced by 2.0g of 1,2-dichloro-4 5-diaminobenzene in the pigment mixture of Example 1, and the same treatment and dyeing as in Example 1 gave a very natural dark brown shade without any undesirable reddish tinge.

EXAMPLE 3

1,2-dimethyl-4,5-diaminobenzene was replaced by 1.8g of 1,3-difluoro-4,6-diaminobenzene in Example 1, and the same treatment and application to blonde human hair as in Example 1 gave a natural dark ash brown shade without any undesirable reddish tinge.

EXAMPLE 4

7.5 parts of glycerol monostearate, 4.0 parts of cetyl alcohol, 2.5 parts of propylene glycerol stearate, 1.5 parts of 30% alkyl sulphonate, 5.0 parts of 25% aqueous ammonia, 1.0 part of ammonium phosphate, 0.38 parts of 1,3-diamino-4,6-difluorobenzene and 0.55 part of 2,5-diaminotoluene sulphate were mixed and emulsified with water, giving 50 parts of a hair dye cream. Application to grey hair strands gave a strong blonde tint which showed only very slight fading after exposure to a high intensity xenon lamp for 40 hours whilst the shade was retained.

When the 1,3-diamino-4,6-difluorobenzene was replaced by (a) 2,4-diamino-1-fluorobenzene and (b) 2,4-diamino-1-methylbenzene it was found that exposure to a high-pressure xenon lamp for 40 hours produced a high degree of fading in the switches, as well as a change from brown to yellow and from blue to green, respectively.

Further dye pastes were prepared as in Example 1 by successively replacing 1,2-dimethyl-4,5-diaminobenzene by 1.6 parts of 1,2-diamino-4-methylbenzene, 1.8 parts of 1,2-diamino-4-chlorobenzene and 1.6 parts of 1,3-diamino-methylbenzene. The colours obtained by using these compositions in the same way as described in Example 1 hardly differed in the freshly dyed state from those obtained with the compositions of Examples 1, 2 and 3. However, when the switches were exposed for 40 hours to a high intensity xenon lamp having a spectrum similar to daylight, with the lower half of each strand covered for purposes of comparison, the colourants of Examples 1, 2 and 3 showed hardly any colour change on the exposed half, whereas the exposed half of the switches dyed with 1,2-diamino-4-methylbenzene faded to a light brown tint. The exposed half of the switches dyed with 1,3-diamino-4-methylbenzene showed a greenish tint. The switches dyed with 1,2-diamino-4-chlorobenzene did not change much immediately after exposure, but after storage in darkness for about three weeks the whole switches had an undesirable reddish tinge.

EXAMPLE 5

Hair colourant compositions containing various amounts of various oxidation dyestuffs as shown in Table 1 were prepared by adding the indicated amounts of the dyestuffs to a base having the following composition.

| | |
|---|---:|
| Tegin P | 7.5 g |
| Cetyl alcohol | 4.0 g |
| Emulsifier 157 | 2.5 g |
| Warolat U (30% solution) | 1.5 g |
| Ammonia solution (25%) | 5.0 g |
| Ammonium phosphate | 1.0 g |
| Demineralised water | to 50.0 g |
| Hydrogen peroxide (6% solution) | 50.0 g |

"Tegin P" (Trade Mark) is an ethanolamine solution containing 5 parts by volume of ethanolamine to 1 part of water. "Emulsifier 157" (Trade Mark) is a mixture of the monostearate and the distearate of 1,2-propylene glycol, available from Atlas Goldschmidt GmbH.

"Warolat U" (Trade Mark) is a sodium alkylsulphonate with an average molecular weight of 315 available from Farbenfabriken Bayer AG.

The above table shows that at low level, a composition containing a dyestuff according to the invention together with 2,5-diaminotoluene is superior in fade resistance and in stability to acid treatment to two prior art dyestuffs. At higher level compositions containing the same dyestuff together with 2,5-diaminotoluene and resorcinol are fully comparable with the prior art compositions.

Table 1

| Expt. No. | Diamino Oxidation Dyestuff | Amount | Resorcinol g. | 2,5-diamino-Toluene | Colour | Change on Exposure to intense light | Change on treatment with acid solution |
|---|---|---|---|---|---|---|---|
| I | 1,3-diamino-4,6-difluorobenzene | 0.35 | — | 0.55 | Medium blonde | Slight fading -retention of shade | Shift to reddish gold |
| V | 1,3-diamino-4,6-difluorobenzene | 0.72 | 0.55 | 1.1 | Rich brown | Very slight fading | Slifht shift to red |
| II | 2,4-diamino-1-fluorobenzene | 0.30 | — | 0.55 | Light brown/violet highlight | Slight fading to yellow, more pronounced than I | Shift to reddish violet, stronger than I |
| VI | 2,4-diamino-1-fluorobenzene | 0.63 | 0.55 | 1.1 | Rich brown | Very slight fading | Slight shift to red |
| III | 2,4-diamino-1-methylbenzene | 0.30 | — | 0.55 | Rich blue | Fading, more pronounced than I | Shift to blue - fading |
| VI | 2 4-diamino-1-methylbenzene | 0.61 | 0.55 | 1.1 | Rich brown | Very slight fading | Slight shift to red |
| IV | — | — | — | 0.55 | Rose-wood brown | Fading to yellow, more pronounced than I | Shift to red - fading |
| VIII | — | — | 0.55 | 1.1 | Rich brown | Very slight fading | Slight shift to red |

What is claimed is:

1. A hair colourant composition having a pH between 8 to 10 comprising a mixture of dyestuffs and a carrier therefor the mixture of dyestuffs comprising a 1,2- or 1,3-diaminobenzene substituted in the positions para to the amino groups by identical substituents selected from the group consisting of $C_1$ to $C_3$ alkyl groups and halogen atoms and 2,5-diamino toluene or a salt thereof in a molar ratio of less than 1:1.

2. A hair colourant composition according to claim 1 wherein the mixture of dyestuffs additionally comprises resorcinol.

3. A hair colorant composition according to claim 1 wherein the $C_1$ to $C_3$ alkyl groups are methyl groups.

4. A hair colorant composition according to claim 1 wherein the halogen atoms are fluorine atoms.

* * * * *